United States Patent
Inayoshi et al.

(10) Patent No.: US 7,514,638 B2
(45) Date of Patent: Apr. 7, 2009

(54) SEAT LOAD DETECTION APPARATUS

(75) Inventors: Muneto Inayoshi, Anjo (JP); Koji Itoh, Nagoya (JP); Hiroyuki Fujii, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 443 days.

(21) Appl. No.: 11/268,624

(22) Filed: Nov. 8, 2005

(65) Prior Publication Data

US 2006/0170259 A1 Aug. 3, 2006

(30) Foreign Application Priority Data

Nov. 19, 2004 (JP) ............................ 2004-335813

(51) Int. Cl.
*B60R 21/015* (2006.01)
(52) U.S. Cl. ................... 177/136; 177/144; 177/211; 73/862.044; 180/273; 280/735
(58) Field of Classification Search ............. 180/273; 280/735; 177/136, 144, 211; 73/862.044, 73/862.045
See application file for complete search history.

(56) References Cited

U.S. PATENT DOCUMENTS

| | | | |
|---|---|---|---|
| 5,222,399 A * | 6/1993 | Kropp | 73/862.68 |
| 6,069,325 A | 5/2000 | Aoki | |
| 6,323,443 B1 | 11/2001 | Aoki et al. | |
| 6,342,683 B1 | 1/2002 | Aoki et al. | |
| 7,047,823 B2 * | 5/2006 | Wilkie et al. | 73/862.045 |
| 7,049,529 B2 * | 5/2006 | Vogel et al. | 177/144 |
| 7,055,365 B2 * | 6/2006 | Yanagi | 73/1.13 |
| 7,112,749 B2 * | 9/2006 | DiPaola et al. | 177/136 |
| 7,189,931 B2 * | 3/2007 | Hida et al. | 177/144 |
| 7,328,627 B2 | 2/2008 | Kawabata et al. | |
| 2003/0111276 A1 | 6/2003 | Kajiyama | |
| 2004/0124018 A1 * | 7/2004 | Yanagi | 177/144 |

FOREIGN PATENT DOCUMENTS

| | | |
|---|---|---|
| JP | 11-304579 A | 11/1999 |
| JP | 11-351952 A | 12/1999 |
| JP | 2001-12998 A | 1/2001 |
| JP | 2003-083798 | 3/2003 |
| JP | 2003-097997 A | 4/2003 |
| JP | 2003-177052 A | 6/2003 |
| JP | 2003-194621 A | 7/2003 |
| JP | 2004-268620 | 9/2004 |

* cited by examiner

*Primary Examiner*—Randy W Gibson
(74) *Attorney, Agent, or Firm*—Buchanan Ingersoll & Rooney PC

(57) ABSTRACT

A sensor body is interposed between a leg bracket and a lower rail and detects a seat load. A plate member of the sensor body is a unit including a circular strain element having an axial line in the vertical direction and a substrate extending radially from the strain element. An outer circumferential support member is attached to the leg bracket to hold the outer circumferential edge of the strain element. An inner circumferential support member is attached to the lower rail to hold the inner circumferential edge of the strain element. The strain element includes a strain gauge configured to output a signal in accordance with the load in the axial direction of the strain element on the basis of the distortion between the outer and inner circumferences. The substrate includes an electric circuit electrically connected the strain gauge and configured to process the output signal from strain gauge.

12 Claims, 9 Drawing Sheets

SEAT LOAD DETECTION APPARATUS

CROSS REFERENCES TO RELATED APPLICATIONS

This application is based on and claims priority under 35 U.S.C. Section 119 with respect to Japanese Patent Application No. 2004-335813 filed in the Japanese Patent Office on Apr. 16, 2004, the entire contents of which are incorporated herein by reference.

BACKGROUND OF THE INVENTION

1. Field of the Invention

The present invention relates to a seat load detection apparatus.

2. Description of the Related Art

A known seat load detection apparatus is described in, for example, Japanese Unexamined Patent Application Publication No. 2003-83798. This seat load detection apparatus includes cantilever type rectangular strain elements 21 each including a strain gauge 22. More specifically, one end of each of the strain elements 21 is fixed to the seating portion of the seat with a bracket 23 having an L-shaped cross-section, whereas the other end is fixed to the vehicle body side of the seat with another bracket 24 having an L-shaped cross-section. When one of the ends of the strain element 21 is bent with respect to the other end due to load applied on the seat, the output signal from the strain gauge 22 changes in accordance with the amount of bending, enabling the seat load detection apparatus to detect the applied load.

However, for such a known seat load detection apparatus, brackets 23 and 24 having L-shaped cross-sections are required for mounting the apparatus on a seat, increasing the overall size and weight of the apparatus. Furthermore, since the strain elements 21 have a cantilever structure, stoppers 25a and 27a are required to limit the amount of distortion in the vertical direction of the strain elements 21 in order to maintain sufficient strength to support the seat. Therefore, the known seat load detection apparatus has a complex structure.

Such a known seat load detection apparatus having a reduced size is also described in Japanese Unexamined Patent Application Publication No. 2004-268620. This known seat load detection apparatus includes a bolt 30, which forms a single unit with a flange 20 in contact with and mounted on an upper rail 42, and a disc-shaped strain element 14, which is attached to a depression 24 formed on the flange 20. The bolt 30 is provided orthogonally to the flange 20. The bolt 30 is passed through a nut 66 and attached to a bracket 48, which is used to install the seat. A sensor 12 for detecting the load applied to the bolt 30 in the axial direction is disposed on the strain element 14. According to this structure, when the inner circumference of the strain element 14 bends with respect to the outer circumference due to the load applied in the axial direction of the bolt 30 on the seat, the load is detected as a change in the output signal from the sensor 12 in accordance with the degree of bending. Although the strain element 14 has a small size, the diaphragm structure of the strain element 14 provides sufficient strength for supporting the seat.

The seat load detection apparatus according to Japanese Unexamined Patent Application Publication No. 2004-268620 requires an electric circuit for processing the output signal from the sensor to detect the load applied on the seat. Such an electric circuit is mounted on a circuit board provided separately from the seat load detection apparatus and is electrically connected to the sensor via leads. Therefore, to dispose the circuit board including the electric circuit in the vicinity of the sensor 12, space for preventing the circuit board from interfering with the flange 20 must be provided. As a result, the overall size of the seat load detection apparatus becomes large. If, instead, the circuit board including the electric circuit is disposed separately from the sensor in order to prevent interference with the flange 20, the electrical wiring becomes complicated.

The assignee has considered providing a bolt unit forming a unit including a bolt and a substrate (circuit board) on which an electric circuit can be mounted so as to minimize the space required for proving the substrate. However, in such a case, the bolt protrudes from the flat substrate. Therefore it is difficult to mount the electric circuit on the substrate unless the seat load detection apparatus has a structure that is large enough to include the three-dimensional bolt unit.

SUMMARY OF THE INVENTION

A seat load detection apparatus according to embodiments of the present invention has a reduced-size and allows an electric circuit for processing output signals from a detection element to be provided easily.

To solve the above-identified problems, a seat load detection apparatus according to a first aspect of the present invention is provided. The seat load detection apparatus according to a first aspect of the present invention is configured to detect a load applied on a seat and is interposed between a seat-fixing member for a floor and a fixing member for the seat, and the apparatus includes a plate member forming a unit including a circular strain element having an axis extending in the vertical direction and a substrate extending in the radial direction of the strain element, an outer circumferential support member configured to support the edge of the outer circumference of the strain element wherein the outer circumferential support member is attached to one of the seat-fixing member for the floor and the fixing member for the seat, an inner circumferential support member configured to support the edge of the inner circumference of the strain element, the inner circumferential support member being attached on the other one of the seat-fixing member for the floor and the fixing member for the seat, a detection element configured to output a signal corresponding to the load applied to the strain element in the axial direction on the basis of distortion generated between the outer circumference and the inner circumference of the strain element wherein the detection element is disposed on the strain element, and an electric circuit configured to process the signal output from the detection element wherein the electric circuit being electrically connected to the detection element and being mounted on the substrate.

A second aspect of the present invention provides the seat load detection apparatus according to the first aspect of the present invention wherein the outer circumferential support member includes a first holding member and a second holding member, the first holding member and the second holding member are stacked along the axial direction at the outer area in the radial direction and sandwich the edge of the outer circumference of the strain element, and the first holding member and the second holding member are welded together by welding directed in the radial direction toward the outer circumference.

The outer circumferential support member may desirably include the first holding member and the second holding member that sandwich the edge of the outer circumference of the strain element and include engagement means for engaging the first holding member and the second holding member.

The first holding member and the second holding member may desirably be stacked along the axial direction at the outward area in the radial direction and welded together by welding directed in the radial direction toward the outer circumference.

The outer circumferential support member includes the first holding member and the second holding member holding the edge of the outer circumference of the strain element and desirably has a caulking part on one of the first holding member and the second holding member so as to hold the edge of the outer circumference of the other one of the first holding member and the second holding member.

A third aspect of the present invention provides the seat load detection apparatus according to the first or second aspect of the present invention wherein the inner circumferential support member has a nut structure, and the inner circumferential support member is fixed to the other one of the seat-fixing member for the floor and the fixing member for the seat by screwing the nut structure onto a bolt with the other one of the seat-fixing member for the floor and the fixing member for the seat being interposed between the nut structure and the head of the bolt.

A fourth aspect of the present invention provides the seat load detection apparatus according to the first or second aspect of the present invention further including rotation prevention means for limiting the relative rotation of the outer circumferential support member and one of the seat-fixing member for the floor and the fixing member for the seat.

A fifth aspect of the present invention provides the seat load detection apparatus according to the fourth aspect of the present invention wherein the rotation prevention means is engagement means for engaging the outer circumferential support member and one of the seat-fixing member for the floor and the fixing member for the seat.

A sixth aspect of the present invention provides the seat load detection apparatus according to the fourth aspect of the present invention wherein the rotation prevention means includes a plurality of fixing units configured to join the outer circumferential support member and one of the seat-fixing member for the floor and the fixing member for the seat.

A seventh aspect of the present invention provides the seat load detection apparatus according to the sixth aspect of the present invention wherein the outer circumferential support member comprises a flange extending outwards in the radial direction, and each of the fixing units includes a fastening member configured to join the flange and one of the seat-fixing member for the floor and the fixing member for the seat.

An eighth aspect of the present invention provides the seat load detection apparatus according to the seventh aspect of the present invention further including an elastic material interposed between the flange and one of the seat-fixing member for the floor and the fixing member for the seat.

A ninth aspect of the present invention provides the seat load detection apparatus according to the sixth aspect of the present invention wherein each of the fixing units includes a nut structure on the outer circumferential support member and a bolt screwed into the nut structure with one of the seat-fixing member for the floor and the fixing member for the seat being interposed between the nut structure and the head of the bolt.

The rotation prevention means desirably includes a protruding wall, a cover member, and a bolt, wherein the protruding wall extends outward of the outer circumferential support member corresponding to the width direction of one of the seat-fixing member for the floor and has a nut structure whose penetration direction is parallel to the radial direction, the cover member is fixed on one of the seat-fixing member for the floor and the fixing member for the seat and covers the end surface of the protruding wall, and the bolt is screwed into a nut structure screwed while the cover member is interposed between the nut structure and the head of the bolt.

A tenth aspect of the present invention provides the seat load detection apparatus according to the first or second aspect of the present invention further including rotation prevention means for limiting the relative rotation of the inner circumferential support member and the other one of the seat-fixing member for the floor and the fixing member for the seat.

The rotation prevention means desirably includes a plurality of fixing units configured to join the inner circumferential support member and the other one of the seat-fixing member for the floor and the fixing member for the seat.

The inner circumferential support member desirably includes a flange extending outwards in the radial direction, and each of the fixing units desirably includes a fastening member configured to join the flange and one of the seat-fixing member for the floor and the fixing member for the seat.

The inner circumferential support member includes a nut structure, and a bolt is screwed into the nut structure wherein the other one of the seat-fixing member for the floor and the fixing member for the seat is interposed between the nut structure and the head of the bolt. The rotation prevention means is provided on the inner circumferential support member and is desirably a latch unit configured to latch with the other one of the seat-fixing member for the floor and the fixing member for the seat.

According to the first or third aspect of the present invention, the substrate including the electric circuit is provided on the plate member as a unit together with the strain element. Accordingly, the space required for disposing the electric circuit can be reduced. Since the plate member including the strain element is flat, it is easy to mount the electric circuit including the printed wiring on the substrate as in a similar manner as a standard circuit board.

According to the second aspect of the present invention, the first holding member and the second holding member stacked along the axial direction are welded together by welding directed in the radial direction toward the outer circumference. Accordingly, as a result of contraction of the material caused by distortion due to welding directed in the radial direction, the first holding member and the second holding member can firmly hold the edges of the outer circumference of the strain element.

The first and second holding members can be firmly fixed by engaging the first and second holding members with the engagement means. In this way, the edges of the outer circumference of the strain element can be firmly held by the tightly and second holding members.

The first and second holding members stacked along the axial direction are welded together by welding directed in the radial direction toward the outer circumference. Accordingly, as a result of contraction of the material caused by distortion due to welding directed in the radial direction, the first holding member and the second holding member can firmly hold the edges of the outer circumference of the strain element.

By holding the edge of the outer circumference of one of the first holding member and the second holding member with the caulking part provided on the other one of the first holding member and the second holding member, the first holding member and the second holding member can firmly hold the edges of the outer circumference of the strain element.

According to the fourth or fifth aspect of the present invention, the rotation prevention means can prevent the outer circumferential support member (seat load detection apparatus) from being displace in the circumferential direction with respect to one of the seat-fixing member for the floor and the fixing member for the seat during assembly or installation.

According to the sixth or ninth aspect of the present invention, the rotation prevention means includes a plurality of fixing units configured to join the outer circumferential support member and one of the seat-fixing member for the floor and the fixing member for the seat. In this way, the attachment strength of the outer circumferential support member to one of the seat-fixing member for the floor and the fixing member for the seat is increased.

According to the seventh aspect of the present invention, since the outer circumferential support member is joined with one of the seat-fixing member for the floor and the fixing member for the seat by engaging the flange extending outward in the radial direction and one of the seat-fixing member for the floor and the fixing member for the seat with the fastening member. As a result, rigidity is increased, further increasing the attachment strength of the outer circumferential support member to one of the seat-fixing member for the floor and the fixing member for the seat.

According to the eighth aspect of the present invention, since the moment of force generated between the flange and one of the seat-fixing member for the floor and the fixing member for the seat is absorbed by the elastic member, unwanted distortion of the strain element is suppressed and the load detection accuracy is improved.

The rotation prevention means includes the protruding wall extending outward of the outer circumferential support member, a cover member covering the end surface of the protruding wall, and the bolt screwed into the nut structure of the protruding wall with the cover member interposed between the nut structure and the head of the bolt. Accordingly, the outer circumferential support member is attached to one of the seat-fixing member for the floor and the fixing member for the seat with the cover member interposed between the support member and the fixing member by screwing the bolt into the nut structure having an opening in the protruding wall parallel to the radial direction of the outer circumferential support member. For this reason, rotation can be prevented with only one pair of nut structure (protruding wall) and bolt.

According to the tenth aspect of the present invention, the rotation prevention means can prevent the inner circumferential support member (seat load detection apparatus) from being displace in the circumferential direction with respect to the other one of the seat-fixing member for the floor and the fixing member for the seat during assembly or installation.

The rotation prevention means includes a plurality of fixing units configured to join the inner circumferential support member and the other one of the seat-fixing member for the floor and the fixing member for the seat. In this way, the attachment strength of the inner circumferential support member to the other one of the seat-fixing member for the floor and the fixing member for the seat is increased.

Since the inner circumferential support member is joined with one of the seat-fixing member for the floor and the fixing member for the seat by engaging the flange extending outward in the radial direction and the other one of the seat-fixing member for the floor and the fixing member for the seat with the fastening member. As a result, rigidity is increased, further increasing the attachment strength of the inner circumferential support member to the other one of the seat-fixing member for the floor and the fixing member for the seat.

DESCRIPTION OF THE PREFERRED EMBODIMENTS

First Embodiment

A seat load detection apparatus according to a first embodiment of the present invention will be described below with reference to the drawings.

Figure 1:
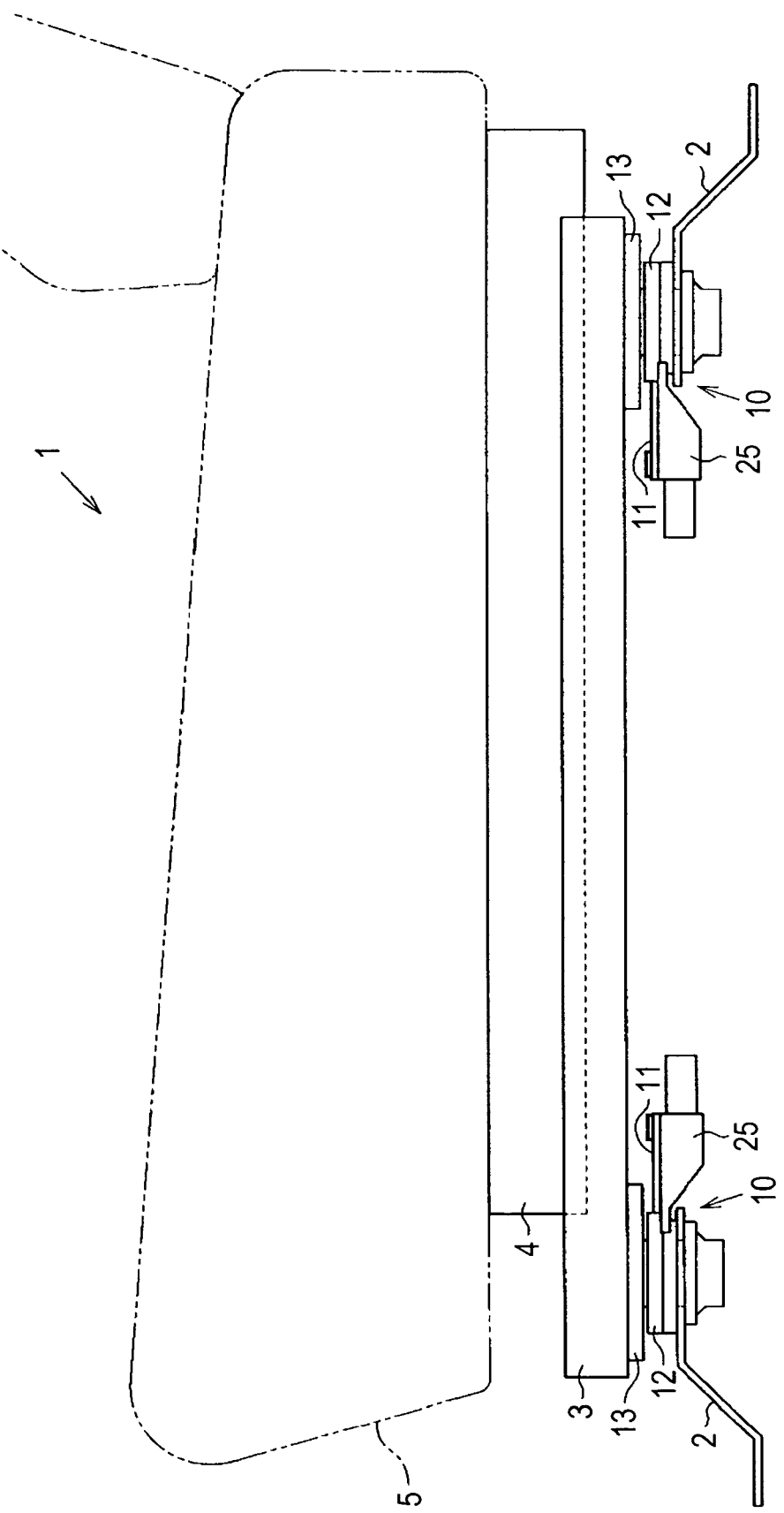
FIG. 1 is a schematic view of a seat body according to an embodiment of the present invention.

FIG. 1 is a side view of the frame of a seat body 1 mounted on a passenger side seat of a vehicle, such as an automobile. A pair of frames is provided in the width direction of the seat body 1 (i.e., the direction orthogonal to the surface of the page of FIG. 1). FIG. 1 is a side view, viewed from the outer side of the seat, of one of the frames disposed on the left side of the vehicle when facing the front of the vehicle. Since the frame disposed on the right side of the vehicle has the same structure as the frame on the left, only the frame on the left will be described below.

As shown in FIG. 1, the seat body 1 includes a pair of leg brackets 2 provided, toward the front and rear of the vehicle (i.e., in the longitudinal direction), as seat-fixing members fixed to the upper surface of the vehicle floor (not shown in the drawing). The upper surfaces of the leg brackets 2 support a lower rail 3 that functions as a seat-fixing member with sensor bodies 10 having a predetermined thickness interposed between the surfaces of the leg brackets 2 and the lower rail 3. On the upper portion of the lower rail 3, an upper rail 4 is mounted in a manner such that the upper rail 4 slidable in the longitudinal direction of the vehicle. The upper rail 4 supports a seat cushion 5 (the structure of the upper rail 4 supporting the seat cushion 5 is not shown in the drawing).

The sensor bodies 10 interposed between the leg brackets 2 and the lower rail 3 detect a load applied on the seat (i.e., load applied on the seat cushion 5 in the vertical direction). As shown in the longitudinal cross-sectional view and the perspective view of FIGS. 2 and 3, respectively, each of the sensor bodies 10 includes a plate member 11, an outer circumferential support member 12, and an inner circumferential support member 13.

Figure 4:
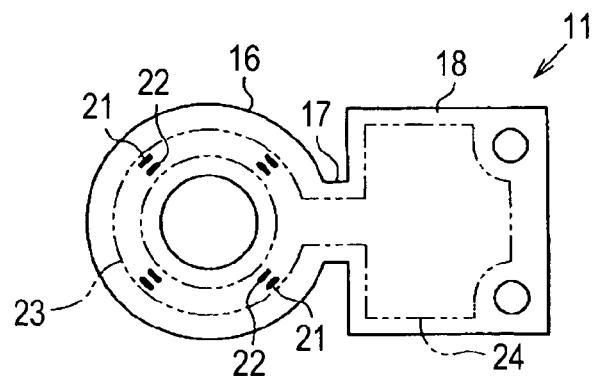
FIG. 4 is a plan view illustrating a plate member.

As shown in FIG. 4, the plate member 11 is a plate integrating a circular strain element 16, a neck 17, and a substrate 18 extending in the radial direction of the strain element 16 from the neck 17. The plate member 11 is interposed between one of the leg brackets 2 and one of the lower rails 3 so that the axial direction of the strain element 16 extends in the vertical direction of the sensor bodies 10 (refer to FIG. 2). Pairs of strain gauges 21 and 22 that are detection elements are provided around the circumference of the strain element 16 at predetermined angles so that each of the pairs of strain gauges 21 and 22 is disposed a predetermined distance apart from each other. The strain gauges 21 and 22 are disposed concentrically so that the strain gauge 21 is disposed outside the strain gauge 22. The strain gauges 21 and 22 are printed and burnt on the strain element 16 together with wiring 23. The strain gauges 21 and 22 output a signal in accordance with the load applied in the axial direction of the strain element 16 on the basis of the bending between the outer and inner circumferences of the strain element 16 to the wiring 23.

Wiring 24 connected to the wiring 23 on the strain element 16 at the neck 17 is printed and burnt on the substrate 18. An electric circuit (not shown in the drawing) corresponding to the wiring 24 is mounted on the substrate 18. In other words, the electric circuit mounted on the substrate 18 is electrically connected to the strain gauges 21 and 22 via the wiring 23 and 24. The electric circuit constitutes, for example, an amplifier and is capable of processing the output signals from the strain gauges 21 and 22 so as to detect the load applied on the seat. A connector 25 for electrically connecting external feeder lines and signal lines is connected to the substrate 18 including the electric circuit (refer to FIG. 2).

Figure 2:
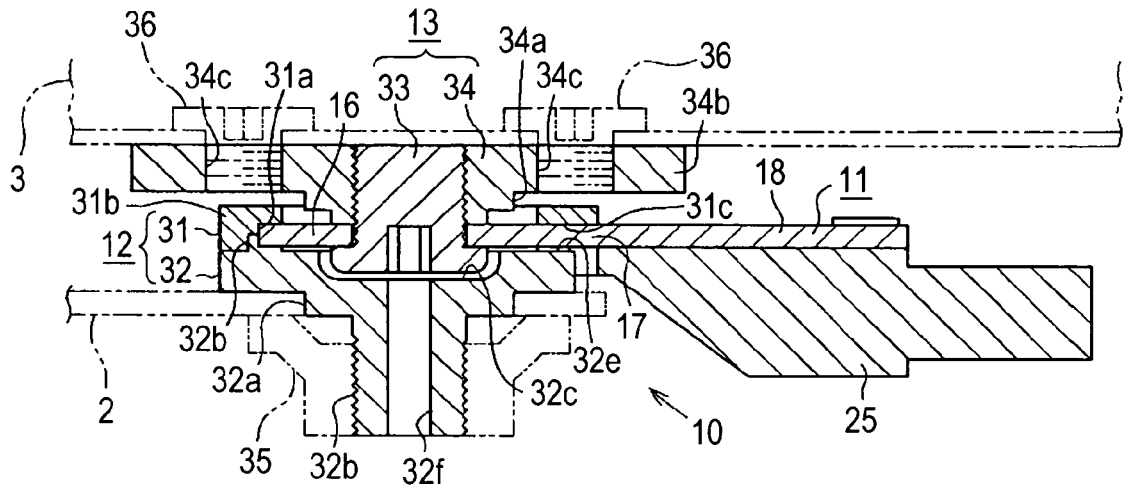
FIG. 2 is a cross-sectional view of a seat load detection apparatus according to a first embodiment of the present invention.
Figure 3:
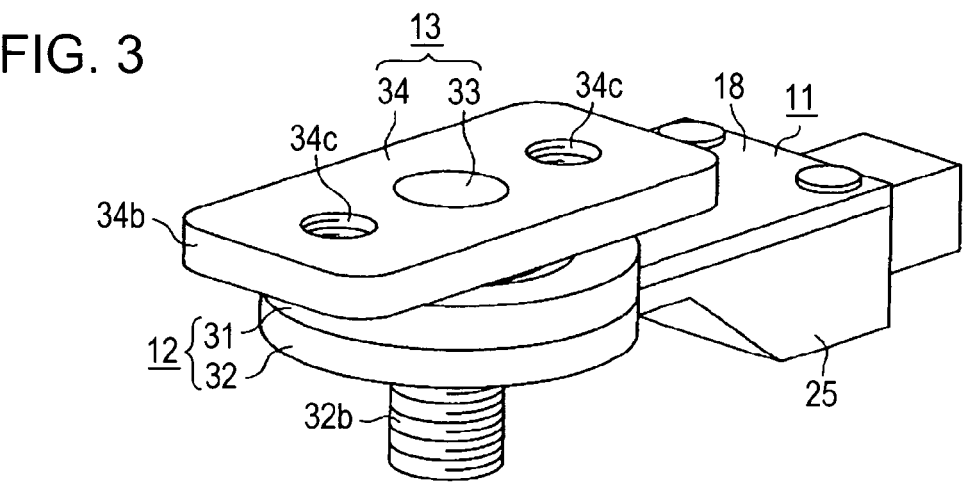
FIG. 3 a perspective view of the seat load detection apparatus shown in FIG. 2.

As shown in FIG. 2, the outer circumferential support member 12 includes a first outer circumferential holder 31 that is a first support member and a second outer circumferential holder 32 that is a second support member. The inner circumference of the circular first outer circumferential holder 31 is smaller than the outer circumference of the strain element 16, whereas the outer circumference of the circular first outer circumferential holder 31 is larger than the outer circumference of the strain element 16. The first outer circumferential holder 31 has a protrusion 31a, whose inner circumference is the same as the outer circumference of the strain element 16, protrudes in the axial direction (towards the lower direction of FIG. 2 towards the second outer circumferential holder 32) and a circular protruding wall 31b protruding in the axial direction at the outer circumference of the protrusion 31a. In other words, the first outer circumferential holder 31 is constituted of step-like structures protruding from a first side in the axial direction so that the outer circumference of the first outer circumferential holder 31 protrudes further.

Part of the outer circumferential surface of the strain element 16 is fit with the protrusion 31a so that the edge of the outer circumference of a second side (i.e., upper surface in FIG. 2) of the strain element 16 is in contact with the first outer circumferential holder 31. The strain gauges 21 and 22 printed and burnt on the plate member 11 are provided on the side facing the second outer circumferential holder 32, i.e., the lower side in FIG. 2. The strain gauges 21 and 22 may instead be provided on the upper side in FIG. 2. The strain element 16 is adhered to the first outer circumferential holder 31 along the contact area on the inner circumference on the first side of the outer circumferential holder 31. The first outer circumferential holder 31 has a notch 31c for guiding the substrate 18 outside from the neck 17 of the plate member 11.

The second outer circumferential holder 32 is a disc having the same outer circumference as that of the first outer circumferential holder 31 and includes a reduced-diameter portion 32a protruding from the first side of the first outer circumferential holder 31 and a bolt (screw shaft) 32b protruding further out from the first side of the reduced-diameter portion 32a. In other words, the second outer circumferential holder 32 has a step-like structure protruding from inner circumference (center) of the first side of the second outer circumferential holder 32.

The second outer circumferential holder 32 has a circular depression 32c formed on the second side (upper surface in FIG. 2) of the second outer circumferential holder 32 having a circumference smaller than the inner circumference of the first outer circumferential holder 31 but larger than the inner circumference of the strain element 16. The second outer circumferential holder 32 has a circular fitting wall 32d having an inner circumference the same as the inner circumference of the first outer circumferential holder 31 and an outer circumference the same as the inner circumference of the protruding wall 31b. The fitting wall 32d has a step-like structure corresponding to the outer shape of the strain element 16 fit with the inner circumferential surface of the bolt 32b and the protrusion 31a. The fitting wall 32d constitutes fitting means together with the protruding wall 31b. The circumferential holders 31 and 32 are attached by fitting together the protruding wall 31b and the fitting wall 32d.

The remaining part of the outer circumferential surface of the strain element 16 is fit with the inner circumferential surface of the fitting wall 32d so that the edge of the outer circumference of the first side (i.e., lower surface in FIG. 2) of the strain element 16 is in contact with the bottom surface of the fitting wall 32d. In other words, the edge of the outer circumference of the strain element 16 is interposed between the circumferential holders 31 and 32. The second outer circumferential holder 32 (fitting wall 32d) has a notch 32e for guiding the substrate 18 outside from the neck 17 of the plate member 11. The second outer circumferential holder 32 also has a draining hole 32f penetrating through the second outer circumferential holder 32 in the vertical direction along the axis.

As shown in FIG. 2, the first outer circumferential holder 31 is stacked on the second outer circumferential holder 32 along the axial direction at the outer circumferential portions. The outer circumferential portions circumferential of the circumferential holders 31 and 32 have parallel contact surfaces extending in a direction orthogonal to the axial direction (i.e., in the radial direction). According to this embodiment, the circumferential holders 31 and 32 stacked in the axial direction are welded together at the outer circumferences by, for example, laser welding or electronic beam welding directed in the radial direction. In this way, the circumferential holders 31 and 32 are melted together deeply along their contact surfaces. It is desirable that the both the circumferential holders 31 and 32 are welded to the strain element 16.

The inner circumferential support member 13 includes a holding bolt 33 and a holding nut 34. The outer circumference of the holding bolt 33 is the same as the inner circumference of the strain element 16. The holding bolt 33 is passed through the strain element 16 from the first side (lower side in FIG. 2) of the strain element 16. The head of the holding bolt 33 is in contact with the first side at the edge of the inner circumference of the strain element 16. The head of the holding bolt 33 is disposed in the space formed between the strain element 16 and the depression 32c. Space is provided between the head of the holding bolt 33 and the depression 32c so that distortion between the outer circumference and the inner circumference of the strain element 16 can be compensated for.

The holding nut 34 is screwed onto the screw portion of the holding bolt 33 passed through the strain element 16 and is in contact with edge of the inner circumference of the second side (upper side in FIG. 2) of the strain element 16. The holding bolt 33 and the holding nut 34 are adhered at their circular border on the second side of the holding nut 34. The outer circumference of the contact area of the holding nut 34 and the strain element 16 is the same as the outer circumference of the head of the holding bolt 33. In other words, the edge of the inner circumference of the strain element 16 is held between the holding bolt 33 and the holding nut 34. The holding nut 34 has an enlarged-diameter portion 34a protruding from the second side (upper side in FIG. 2) of the holding nut 34. The enlarged-diameter portion 34a has a flange 34b extending outwards in the radial direction at the second side of the holding nut 34. The flange 34b is provided so that the extension direction of the flange 34b matches the extension direction the substrate 18 of the plate member 11. The flange 34b has a pair of nut structures (screw holes) 34c that is provided toward the outer circumference and are vertically penetrated through the flange 34b.

The sensor bodies 10 is disposed on each of the leg brackets 2 in a manner such that the reduced-diameter portion 32a of the second outer circumferential holder 32 (outer circumferential support member 12) are passed through the attachment hole of the leg brackets 2. The sensor bodies 10 (outer circumferential support member 12) is engaged with the leg bracket 2 so that a fixing nut 35 are screwed onto the bolt 32b protruding downward from the leg bracket 2. In the sensor bodies 10, the second side (upper side in FIG. 2) of the flange 34b (inner circumferential support member 13) is disposed in contact with the bottom surface of the lower rail 3 so that the extension direction of the flange 34b matches the longitudinal direction of the lower rail 3. The sensor bodies 10 is engaged with the lower rail 3 by screwing bolts 36 into the nut structures 34c while the bolts 36 are passed through the lower rail 3. The inner circumferential support member 13 (holding nut 34) is engaged with the lower rail 3 with the nut structures 34c and the bolts 36 at two locations. In this way, the relative rotational movement of the inner circumferential support member 13 and the lower rail 3 are limited. The plurality of nut structures 34c and bolts 36 functioning as rotation prevention means are fixing units and fastening members, respectively.

In the above-described structure, when load is applied on the seat, the load is applied to the strain element 16 of the sensor bodies 10 in the axial direction, causing distortion between the outer circumference and the inner circumference of the strain element 16. As a result, the strain gauges 21 and 22 output signals in accordance with the amount of distortion. The output signals from the strain gauges 21 and 22 are processed at the electric circuit mounted on the substrate 18 so as to detect the load applied on the seat.

As described above, the seat load detection apparatus according to this embodiment has the following advantages.

1) The substrate 18 having the electric circuit is provided together with the strain element 16 as a unit, i.e., the plate member 11. Accordingly, the space required for disposing the electric circuit can be prevented from being increased. Since the plate member 11 including the strain element 16 is a plate, an electric circuit can be easily mounted and the wiring can be easily printed on the substrate 18 in accordance with, for example, the method of forming an electric circuit on a standard circuit board.

2) The circumferential holders 31 and 32 can be firmly fixed by engaging the circumferential holders 31 and 32 with the protruding wall 31b and the depressions 31d. The edge of the outer circumference of the strain element 16 can be held firmly between the circumferential holders 31 and 32.

3) The circumferential holders 31 and 32 stacked and fixed together in the axial direction are welded together at the outer circumferences by welding (for example, laser welding or electronic beam welding) directed in the radial direction. Accordingly, as a result of contraction of the material caused by distortion due to welding directed in the radial direction, the circumferential holders 31 and 32 firmly hold the edges of the outer circumference of the strain element 16. Even if there is a gap between the circumferential holders 31 and 32, the welding causes the gap to be filled. In this way, the accuracy required for the components can be reduced and costs are also reduced.

4) Since rotation prevention means including the plurality of nut structures 34c and bolts 36 is provided, the inner circumferential support member 13 (the entire seat load detection apparatus) can be prevented from being displaced in the circumferential direction with respect to the lower rail 3 during assembly and/or installation.

Moreover, since the rotation prevention means includes a plurality of nut structures 34c and bolts 36 for fastening (joining) the inner circumferential support member 13 and the lower rail 3, the attachment strength of the inner circumferential support member 13 to the lower rail 3 can be increased. In particular, since the inner circumferential support member 13 is joined with the lower rail 3 at the flange 34b extending outwards in the radial direction by engaging the nut structures 34c with the bolts 36, the rigidity is increased, and, thus, the attachment strength of the inner circumferential support member 13 to the lower rail 3 can be increased even more.

5) Since a draining hole 32f is provided on the second outer circumferential holder 32 (outer circumferential support member 12), water that has entered the storage space (depression 32c) of the strain element 16 defined by the outer circumferential support member 12 and the inner circumferential support member 13 can be drained.

6) By detecting the amount of distortion at the strain gauges (thickness gauge) 21 and 22 having large output signals (gauge output), the overall size and thickness of the sensor bodies 10 can be reduced. Accordingly, the sensor bodies 10 can be easily mounted on the seat body 1 (the area between the leg bracket 2 and lower rail 3). Since the strain element 16 has a diaphragm structure, the strain element 16 has sufficient strength for supporting the seat while having a reduced size.

Second Embodiment

A seat load detection apparatus according to a second embodiment of the present invention will be described below with reference to the drawings. The seat load detection apparatus according to the second embodiment has the same structure as the seat load detection apparatus according to the first embodiment, except that the sensor bodies are vertically reversed and mounted on the upper rail 4. Therefore, detailed descriptions of the components that are the same for both the first and second embodiments are omitted.

Figure 5:
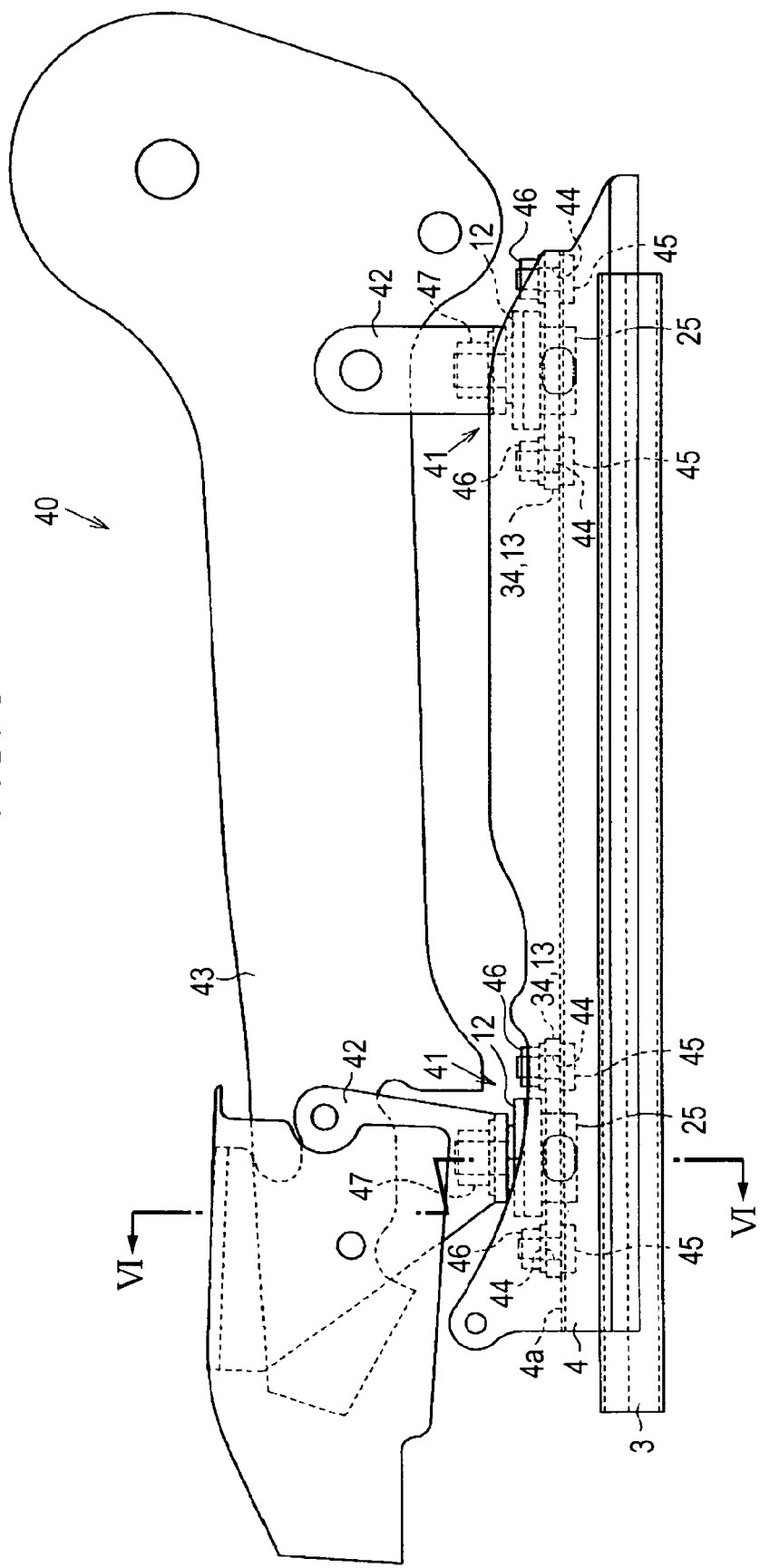
FIG. 5 is a schematic view of a seat body according to another embodiment of the present invention.
Figure 6:
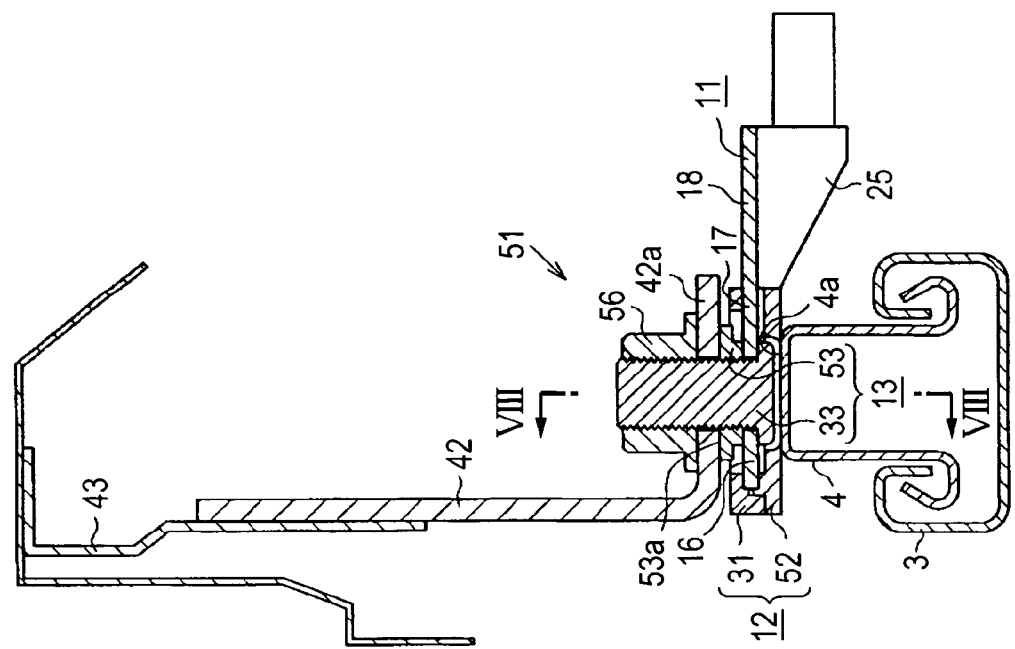
FIG. 6 is a cross-sectional view of a seat load detection apparatus according to a second embodiment of the present invention.

FIG. 5 is a side view of the frame of a seat body 40 mounted on the passenger side of a vehicle, such as an automobile. FIG. 6 is a cross-sectional view taken along line VI-VI in FIG. 5. The frame shown in FIG. 5 is provided as a pair in the width direction (i.e., the direction orthogonal to the surface of the page of FIG. 5) of the seat body 40. FIG. 5 is a side view, viewed from the outer side of the seat, of one of the frames disposed on the left side of the vehicle when facing the front of the vehicle. Since the frame disposed on the right side of the vehicle has the same structure as the frame on the left, only the frame on the left will be described below.

As shown in FIG. 6, the lower rail 3 has a U-shaped cross-section wherein the opening of the U-shape faces upward. The tips of the lower rail 3 at the opening are bend inwards in the width direction (i.e., left and right direction in FIG. 6) and are folded downwards. The upper rail 4, used as a fixing member for fixing the seat on the floor, has a U-shaped cross-section wherein the opening of the U-shape faces downward. The tips of the upper rail 4 at the opening are bend outwards in the width direction and are folded upwards. The upper rail 4 includes a flat surface 4a protruding upwards at the center in the width direction. The folded portion of the upper rail 4 vertically overlaps the folded portion of the lower rail 3 so that the upper rail 4 is attached to the lower rail 3 in such a manner that the upper rail 4 is moveable along the lower rail 3 toward the front and rear of the vehicle.

As shown in FIG. 5, two sensor bodies 41, which are equivalent to sensor bodies 10 according to the first embodiment, are disposed along the longitudinal direction of the vehicle at a predetermined distance apart on the flat surface 4a of the upper rail 4. Each of the sensor bodies 41 supports a lower bracket 42 that is a fixing member. A lower arm 43 that provides a frame for the seat cushion 5 (refer to FIG. 1) is fixed on the lower bracket 42.

The sensor body 41 interposed between the upper rail 4 and the lower bracket 42 has basically the same structure as that of the sensor bodies 10 according to the first embodiment, except that the plate member 11 is supported so that the connector 25 including the strain gauges 21 and 22 printed and burnt onto the strain element 16 is disposed on the first outer circumferential holder 31 at the lower area in FIG. 6. The flange 34b of the holding nut 34 included in the sensor body 41 has a pair of bolt holes 44, which are equivalent to the nut structures 34c according to the first embodiment. The bolt holes 44 are formed towards the outer circumference on opposing sides and vertically penetrate through the flange 34b. The bolt holes 44 are provided in a manner such that their axes do not overlap with the outer circumferential support member 12. The plate member 11 is disposed and supported so that the substrate 18 extends inwards in the width direction orthogonal to the extension direction of the flange 34b (refer to FIG. 6). In this way, the connector 25 engaged with the substrate 18 does not interfere with the upper rail 4.

As shown in FIG. 5, the sensor body 41 is disposed on the flat surface 4a so that the extension direction of the flange 34b matches the longitudinal direction of the upper rail 4. The sensor body 41 is engaged with the upper rail 4 by screwing the bolts 45 into the bolt holes 44 and screwing the bolts 45 into the nuts 46 while the bolts 45 are passed through the flat surface 4a. The inner circumferential support member 13 (holding nut 34) is engaged with the upper rail 4 with bolts 45 and the nuts 46 at two locations. In this way, the relative rotational movement of the inner circumferential support member 13 and the upper rail 4 are limited. The plurality of bolts 45 and nuts 46 functioning as rotation prevention means are fixing units and fastening members, respectively.

As shown in FIG. 6, the lower bracket 42 includes an attachment wall 42a whose lower edge is bent inward in the width direction. The lower bracket 42 is disposed on the reduced-diameter portion 32a so that the bolt 32b of the second outer circumferential holder 32 is passed through the attachment hole of the attachment wall 42a. The sensor body 41 (outer circumferential support member 12) is engaged with the lower bracket 42 by screwing a fixing nut 47 onto the bolt 32b protruding upwards from the attachment wall 42a.

As described above, the seat load detection apparatus according to the second embodiment has the following advantage in addition to the above-described advantages 1, 2, 3, and 6 of the seat load detection apparatus according to the first embodiment.

1) Since rotation prevention means including the plurality of bolts 45 and nuts 46 is provided, the inner circumferential support member 13 (the entire seat load detection apparatus) can be prevented from being displaced in the circumferential direction with respect to the upper rail 4 during assembly and/or installation.

Moreover, since the rotation prevention means includes a plurality of bolts 45 and nuts 46 for fastening (joining) the inner circumferential support member 13 and the upper rail 4, the attachment strength of the inner circumferential support member 13 to the upper rail 4 can be increased. In particular, since the inner circumferential support member 13 is joined with the upper rail 4 at the flange 34b extending outwards in the radial direction by engaging the bolts 45 and the nuts 46, the rigidity is increased, and, thus, the attachment strength of the inner circumferential support member 13 to the upper rail 4 can be increased even more.

Third Embodiment

A seat load detection apparatus according to a third embodiment will be described below with reference to the drawings. The seat load detection apparatus according to the third embodiment has the same structure as the seat load detection apparatus according to the first embodiment, except that the sensor bodies are mounted on the upper rail 4. Therefore, detailed descriptions of the components that are the same for both the first and second embodiments are omitted.

Figure 7:
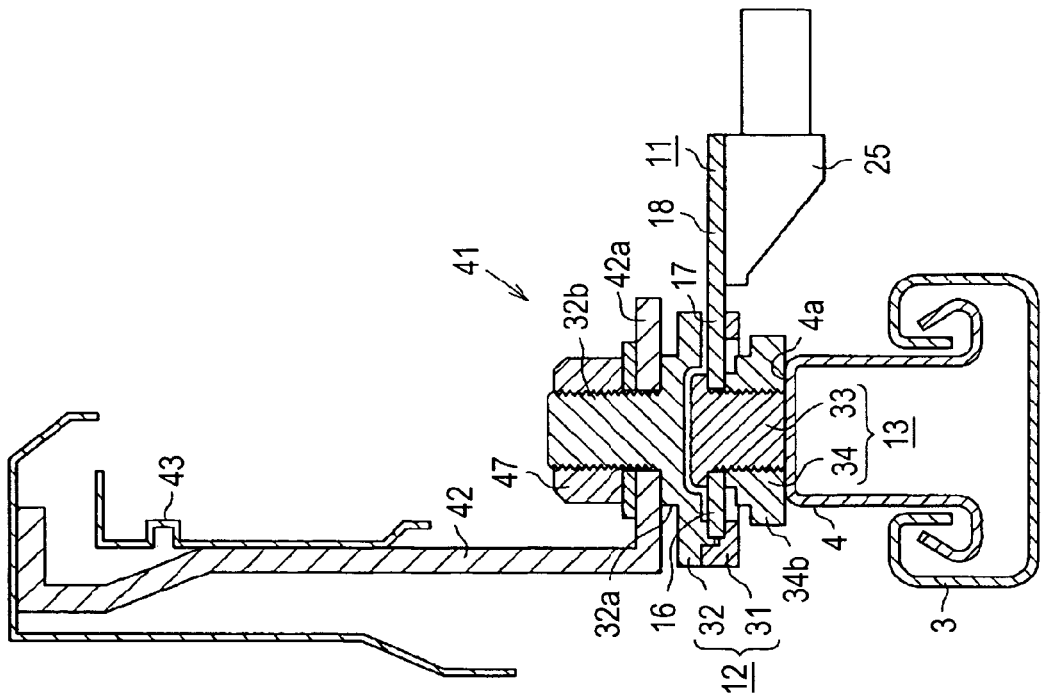
FIG. 7 is a cross-sectional view of a seat load detection apparatus according to a third embodiment of the present invention.
Figure 8:
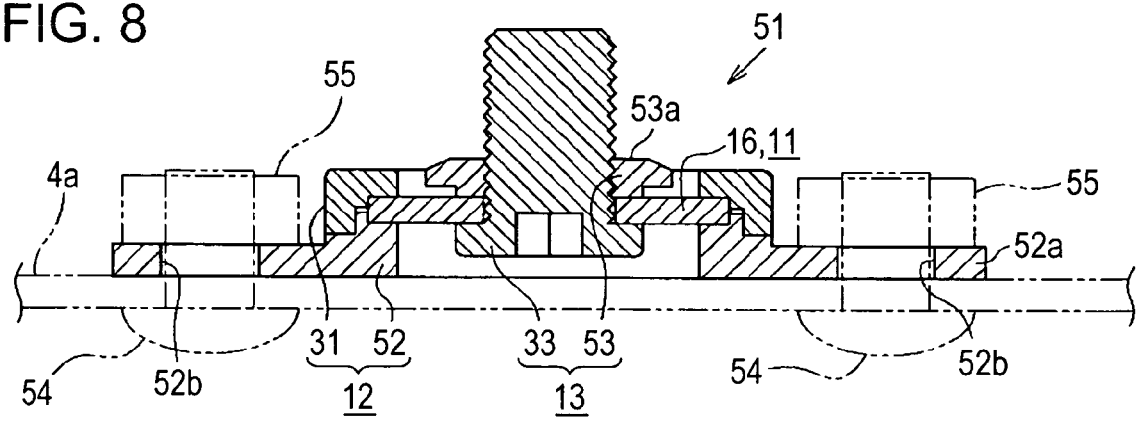
FIG. 8 is a cross-sectional view of a sensor body.

FIG. 7 is a cross-sectional view of a sensor body 51 interposed between the upper rail 4 that is a fixing member for fixing the seat on the floor and the lower bracket 42 (attachment wall 42a) that is a fixing member for fixing the seat on the seat. FIG. 8 is a cross-sectional view of a sensor body 51 taken along line VIII-VIII in FIG. 7. A circular second outer circumferential holder 52 constituting the outer circumferential support member 12 together with the first outer circumferential holder 31 is similar to the second outer circumferential holder 32 according to the first and second embodiments except that it does not include the components such as reduced-diameter portion 32a and bolt 32b. The second outer circumferential holder 52 has a flange 52a extending in opposite directions in the radial direction. The flange 52a extends in a direction orthogonal to the extension direction of the substrate 18 of the plate member 11. The flange 52a is disposed on opposite side in the radial direction and has a pair of bolt holes 52b vertically passing through the flange 52a.

A holding nut 53 constituting the inner circumferential support member 13 together with the holding bolt 33 has a flat surface 53a at the upper surface but does not include components such as the flange 34b according to the first embodiment. The holding nut 53 is screwed onto the holding bolt 33 passed through the strain element 16 and is disposed in contact with the edge of the inner circumference on a second side (upper side in FIG. 8) of the strain element 16. The outer circumference of the contact area of the holding nut 53 and the strain element 16 is the same size as the outer circumference of the head of the holding bolt 33. In other words, the edge of the inner circumference of the strain element 16 is held between the holding bolt 33 and the holding nut 53.

As shown in FIG. 8, the sensor body 51 is disposed on the flat surface 4a so that the extension direction of the flange 52a matches the longitudinal direction of the upper rail 4. At this time, the plate member 11 is disposed and supported so that the substrate 18 extends inwards in the width direction that is orthogonal to the extension direction of the flange 52a (refer to FIG. 7). The sensor body 51 is engaged with the upper rail 4 by screwing bolts 54 into the bolt holes 52b and screwing the bolts 54 into nuts 55 while the bolts 54 are passed through the flat surface 4a. The outer circumferential support member 12 (second outer circumferential holder 52) is engaged with the upper rail 4 with the bolts 54 and the nuts 55 at two locations. In this way, the relative rotational movement of the outer circumferential support member 12 and the upper rail 4 are limited. The plurality of bolts 54 and nuts 55 functioning as rotation prevention means are fixing units and fastening member, respectively.

As shown in FIG. 7, the lower bracket 42 is disposed on the holding nut 53 (flat surface 53a) so that the holding bolt 33 passed through the holding nut 53 is passed through an attachment hole on the attachment wall 42a. The sensor body 51 (inner circumferential support member 13) is engaged with the lower bracket 42 by screwing a fixing nut 56 onto the holding bolt 33 protruding upwards from the attachment wall 42a.

As described above, the seat load detection apparatus according to the third embodiment has the following advantage in addition to the above-described advantages 1, 2, 3, and 6 of the seat load detection apparatus according to the first embodiment.

1) Since rotation prevention means including the plurality of bolts 54 and nuts 55 is provided, the outer circumferential support member 12 (the entire seat load detection apparatus) can be prevented from being displaced in the circumferential direction with respect to the upper rail 4 during assembly and/or installation.

Moreover, since the rotation prevention means includes a plurality of bolts 54 and nuts 55 for fastening (joining) the outer circumferential support member 12 and the upper rail 4, the attachment strength of the outer circumferential support member 12 to the upper rail 4 can be increased. In particular, since the outer circumferential support member 12 is joined with the upper rail 4 at the flange 52a extending outwards in the radial direction by engaging the bolts 54 and the nuts 55, the rigidity is increased, and, thus, the attachment strength of the outer circumferential support member 12 to the upper rail 4 can be increased even more.

2) Since the second outer circumferential holder 52 is formed without the flange 52a protruding in the axial direction and the flange 52a is directly engaged with the upper rail 4, the thickness of the sensor body 51 can be reduced. Accordingly, the sensor body 51 can be easily mounted on the seat body. As a result, the number of components and production cost can be reduced compared to a seat load detection apparatus having brackets provided separately for engagement with the upper rail 4.

Fourth Embodiment

A seat load detection apparatus according to a fourth embodiment will be described below with reference to the drawings. The seat load detection apparatus according to the fourth embodiment has the same structure as the seat load detection apparatus according to the third embodiment, except that the holding nut 53 screwed onto the holding bolt 33 is replaced with an eyenut having an attachment hole on the heat. Therefore, detailed descriptions of the components that are the same for both the first and second embodiments are omitted.

Figure 9:
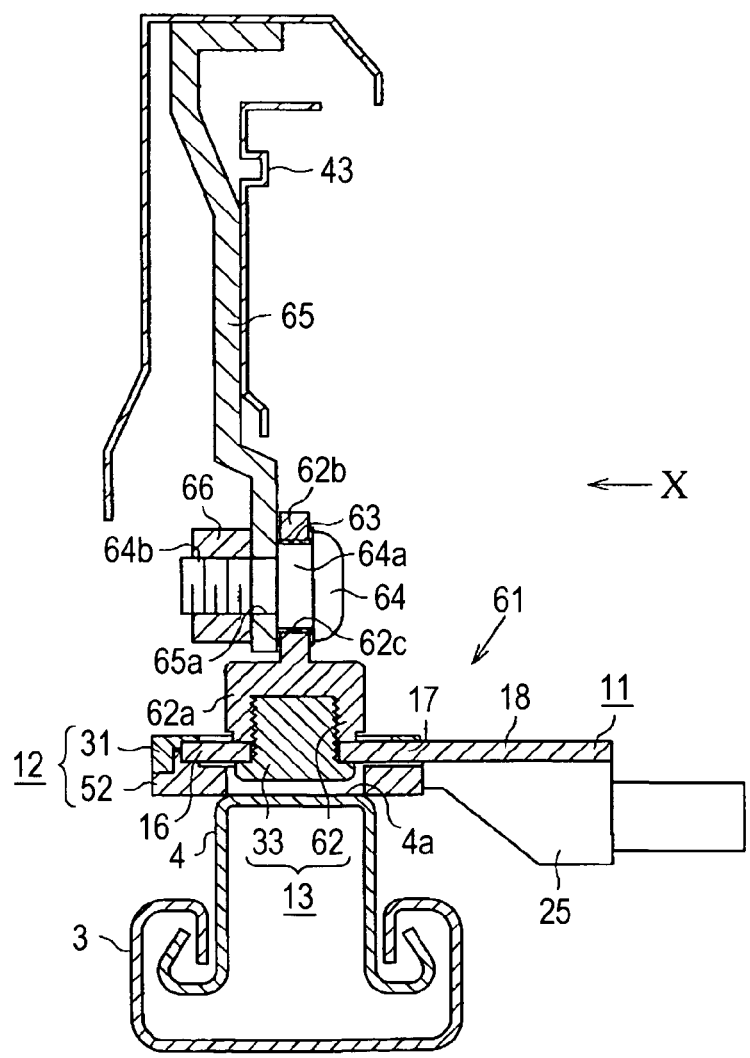
FIG. 9 is a cross-sectional view of a seat load detection apparatus according to a fourth embodiment of the present invention.
Figure 10:
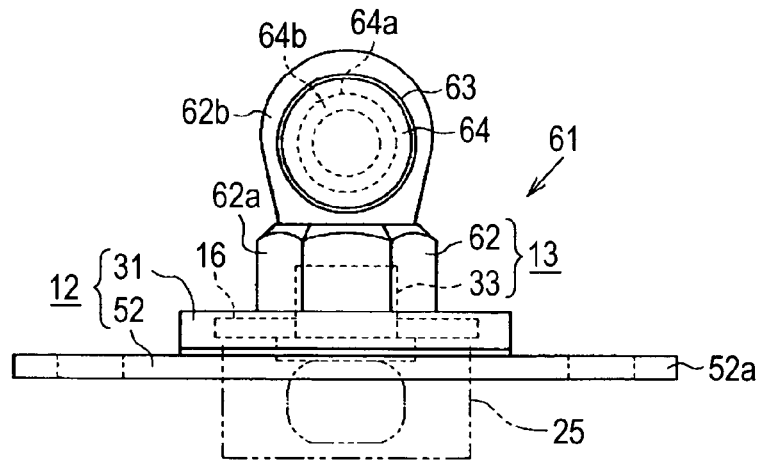
FIG. 10 is an elevational view of the seat load detection apparatus illustrated in FIG. 9 viewed in the direction indicated by an arrow C.

FIG. 9 is a cross-sectional view of a sensor body 61 mounted on the upper rail 4. FIG. 10 is an elevational view of the sensor body 61 viewed in the width direction towards the outward direction (in the direction indicated by arrow C in FIG. 9). According to the fourth embodiment, a holding nut 62 constituting the inner circumferential support member 13 together with the holding bolt 33 forms a unit with and nut-shaped fastening part 62a and an attachment part 62b vertically disposed along the axial line (center line) of the fastening part 62a. The holding nut 62 is screwed onto the holding bolt 33 being passed through the strain element 16 at the fastening part 62a and is disposed in contact with the edge of the inner circumference on a second side (upper side in FIG. 9) of the strain element 16. The outer circumference of the contact area of the holding nut 62 and the strain element 16 is the same size as the outer circumference of the head of the holding bolt 33. In other words, the edge of the inner circumference of the strain element 16 is held between the holding bolt 33 and the holding nut 62 (fastening part 62a).

The attachment part 62b has an attachment hole 62c passing through the center of the attachment part 62b in the thickness direction. The penetration direction of the attachment hole 62c matches the width direction (i.e., width direction of the upper rail 4) when the attachment hole 62c is screwed onto the holding bolt 33. In other words, penetration direction of the attachment hole 62c matches the extension direction of the substrate 18. A bush 63 having an outer circumference that is the same size as the inner circumference of the attachment hole 62c is fit into the attachment hole 62c. The bush 63 is retained in the attachment hole 62c by holding the attachment part 62b with outward flanges provided on opposite side in the axial direction.

A bolt 64 is passed through the bush 63 fit into the attachment hole 62c. The bolt 64 has a large-diameter part 64a having a outer circumference slightly smaller than the inner circumference of the bush 63 and an axial length the same as that of the bush 63 and a bolt part 64b protruding from the large-diameter part 64a. The bolt 64 is passed through the bush 63 fit into the attachment hole 62c from the inner side in the width direction and is supported so that there is slight play between the bush 63 and the large-diameter part 64a.

The lower arm 43 is fixed on and supported by a lower bracket 65. The lower bracket 65 has an attachment hole 65a whose penetration direction matches the width direction. The inner circumference of the attachment hole 65a is the same as the outer circumference of the bolt part 64b. The lower bracket 65 is supported by the holding nut 62 (inner circumferential support member 13) so that the bolt part 64b passing through the bush 63 (attachment hole 62c) is passed through the attachment hole 65a. The sensor body 61 (inner circumferential support member 13) is engaged with the lower bracket 65 by screwing a holding nut 66 onto the bolt part 64b protruding outward in the width direction of the attachment hole 65a.

The sensor body 61 (inner circumferential support member 13) and the lower bracket 65 (lower arm 43) can undulate between the bush 63 and the large-diameter part 64a with in the range of play. In other words, the lower bracket 65, where the lower arm 43 is fixed and supported, can rotate slightly around the axial line of the bush 63 (i.e., can pivot forward and backward). In this way, the assembly error caused by the tilt in the forward and backward directions of the sensor body 61 (inner circumferential support member 13) and the lower bracket 65 can be compensated for and the accuracy of the assembly can be improved.

As described above, the seat load detection apparatus according to the fourth embodiment has the following advantage in addition to the advantages of the seat load detection apparatus according to the third embodiment.

1) The attachment hole 62c, whose a penetration direction matches the width direction, is formed on the holding nut 62 holding the edge of the inner circumference of the strain element 16. Therefore, even if there is not enough space to join the inner circumferential support member 13 and the lower bracket by vertically engaging fastening devices, such as bolts and nuts, as in the third embodiment, the attachment hole 62c of the holding nut 62 can be used to assemble such fastening devices in the width direction (penetration direction). Accordingly, flexibility of the design is increased without increasing the number of components.

2) The assembly error in the forward and backward directions of the lower bracket 65 and the inner circumferential support member 13 (holding nut 62) can be compensated for with in the pivoting range (play) between the bush 63 and the large-diameter part 64a. Accordingly, smooth assembly is possible. Since, during assembly, load applied in a direction causing the lower bracket 65 to tilt in the forward and backward directions is released, unwanted distortion caused by the moment of force generated between the lower bracket 65 and the inner circumferential support member 13 (holding nut 62) is reduced. As a result, the detection accuracy is improved.

3) The lower bracket 65 with the lower arm 43 attached is supported by the attachment part 62b vertically disposed along the axial line (center line) of the fastening part 62a (inner circumferential support member 13). In other words, the lower bracket 65 is engaged with the attachment hole 62c provided on the axial line of the inner circumferential support member 13. In this way, the components of seat load in the axial direction are transmitted to the fastening part 62a (inner circumferential support member 13) via the lower bracket 65 and the attachment hole 62c, whereas the components other than those in the axial direction are absorbed. In this way, unwanted distortion is reduced, and the detection accuracy is improved.

Modifications of Embodiments

The above-described embodiments may be modified as described below.

Figure 11:
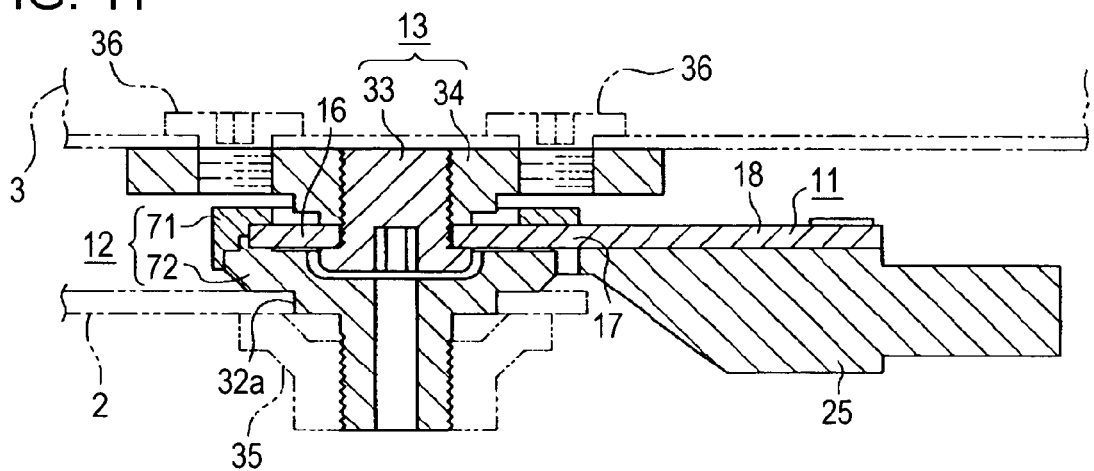
FIG. 11 is a modification of a seat body according to an embodiment of the present invention.

The seat load detection apparatus according to the first embodiment may be modified, as shown in FIG. 11, so that a first outer circumferential holder 71 and a second outer circumferential holder 72 constituting the outer circumferential support member 12 may be stacked in the radial direction. Moreover, the outer circumferential holders 71 and 72 may be welded together by, for example, laser welding directed in the axial direction.

Figure 12:
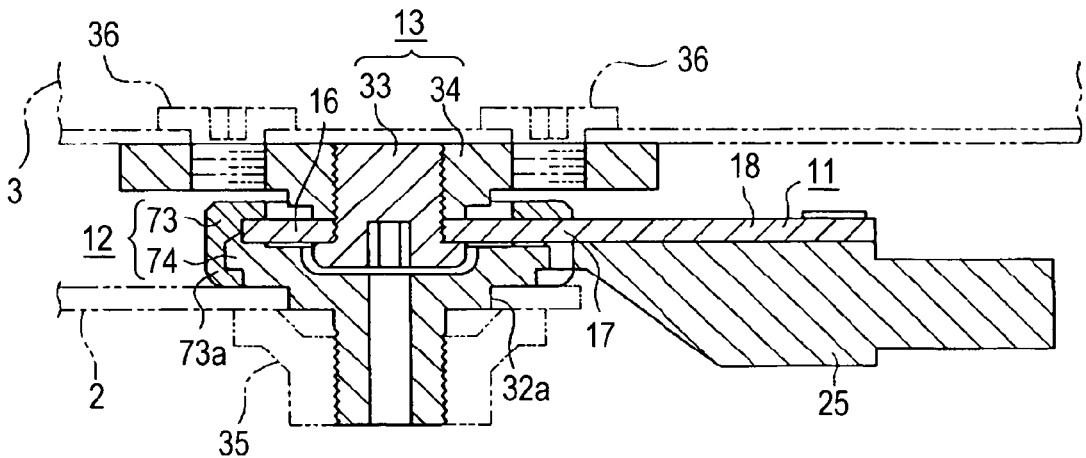
FIG. 12 is a modification of a seat body according to an embodiment of the present invention.

The seat load detection apparatus according to the first embodiment may be modified, as shown in FIG. 12, so that the engagement means (i.e., protruding wall 31b and fitting wall 32d) of a first outer circumferential holder 73 and a second outer circumferential holder 74 constituting the outer circumferential support member 12 may be omitted. Instead, a caulking part 73a holding the edge of the outer circumferences of the outer circumferential holders 73 and 74 may be provided. In such a case, by holding the edge of the outer circumference of the second outer circumferential holder 74 with the caulking part 73a provided on the first outer circumferential holders 73, the outer circumferential holders 73 and 74 can be firmly fixed. Moreover, the edge of the outer circumference of the strain element 16 can also be firmly held by the outer circumferential holders 73 and 74. In particular, even if a gap is formed between outer circumferential holders 73 and 74, the gap can be compensated for by the caulking part 73a. IN this way, the accuracy required for the components can be reduced, and production cost can be reduced.

Figure 13:
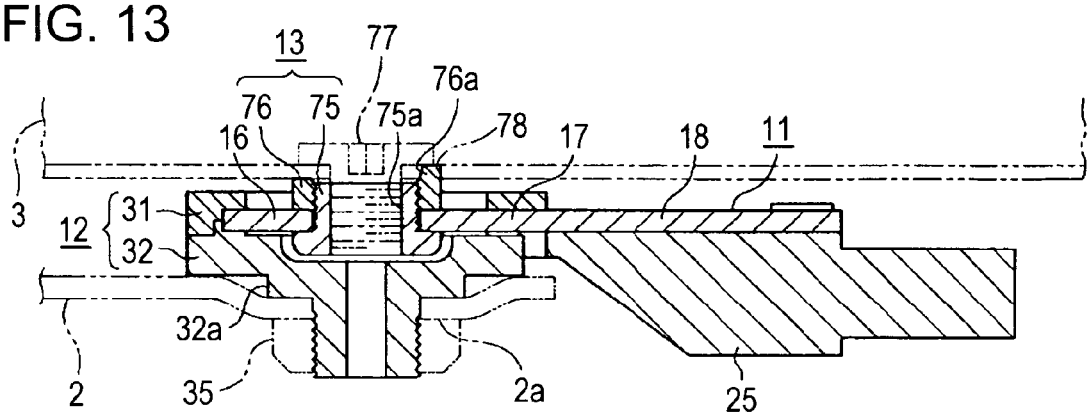
FIG. 13 is a modification of a seat body according to an embodiment of the present invention.

The seat load detection apparatus according to the first embodiment may be modified, as shown in FIG. 13, so that a base 2a protruding downward may be provided on the leg bracket 2 and the reduced-diameter portion 32a of the second outer circumferential holder 32 (outer circumferential support member 12) may be disposed on the base 2a. The outer circumferential support member 12 is engaged with the base 2a by screwing the fixing nut 35 onto the bolt 32b protruding downwards from the leg bracket 2 (base 2a).

A nut structure 75a is formed along the axial line of a holding bolt 75 of the inner circumferential support member 13. A holding nut 76 of the inner circumferential support member 13 has a latch piece 76a, which is a latching unit protruding from one side in the axial direction (i.e., upper side in FIG. 13), provided on outer circumference at a predetermined angle. On the inner circumferential support member 13, a bolt 77 is screwed into the nut structure 75a to fix the lower rail 3. At this time, the inner circumferential support member 13 prevented from rotating by engaging the latch piece 76a of the holding nut 76 with a latch hole 78 formed on the lower rail 3.

The holding nut 76 may be replaced with a collar not having a screw hole. In such a case, axial force is transmitted via the lower rail 3 when the bolt 77 is screwed into the nut structure 75a of the holding bolt 75. In this way, the collar holds the edge of the inner circumference of the strain element 16. In other words, according to this modification, the bolt 77 constitutes part of the inner circumferential support member 13. By providing a latch piece similar to the latch piece 76a on the collar and engaging this latch piece with the latch hole 78, rotation can be prevented.

Figure 14:
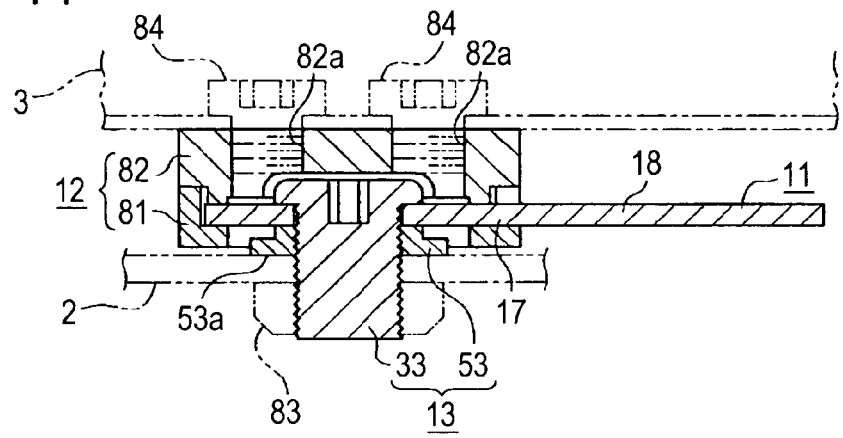
FIG. 14 is a modification of a seat body according to an embodiment of the present invention.

The seat load detection apparatus according to the third embodiment may be modified, as shown in FIG. 14, so that the engagement means (i.e., protruding wall 31b and fitting wall 32d) of a first outer circumferential holder 81 and a second outer circumferential holder 82 constituting the outer circumferential support member 12 may be omitted. The outer circumferential holders 81 and 82 may be welded together at the outer side of the outer circumferences of the outer circumferential holders 81 and 82 stacked along the axial direction by, for example, laser welding directed in the radial direction.

Instead of the flange 52a and the bolt holes 52b, a pair of nut structures 82a, whose penetration direction matches the axial direction, may be disposed on opposite sides in the radial direction on the second outer circumferential holder 82. The nut structures 82a are disposed with in the circle of the second outer circumferential holder 82. According to this structure, the sensor body is interposed between the leg bracket 2 and the lower rail 3. In other words, the sensor body is disposed on the leg bracket 2 so that the flat surface 53a of the holding nut 53 is in contact with the leg bracket 2. The inner circumferential support member 13 is joined with the leg bracket 2 by screwing a holding nut 83 onto a holding bolt 33 protruding down from the leg bracket 2. At the sensor body, a first side of the outer circumferential support member 12 (i.e., upper side in FIG. 14) is disposed in contact with the bottom surface of the lower rail 3 so that the common radial direction of the nut structures 82a and the extension direction of the substrate 18 match with the longitudinal direction of the lower rail 3. The outer circumferential support member 12 is joined with the lower rail 3 by screwing bolts 84 into the nut structures 82a with the lower rail 3 interposed between the nut structures 82a and the heads of the bolts 84. The outer circumferential support member 12 (second outer circumferential holder 82) is joined with the lower rail 3 at two location with the nut structures 82a and the bolts 84. In this way, relative rotation of the outer circumferential support member 12 and the lower rail 3 is limited. The plurality of nut structures 82a and bolts 84 constituting rotation prevention means are used as fixing units and fastening members.

Figure 15:
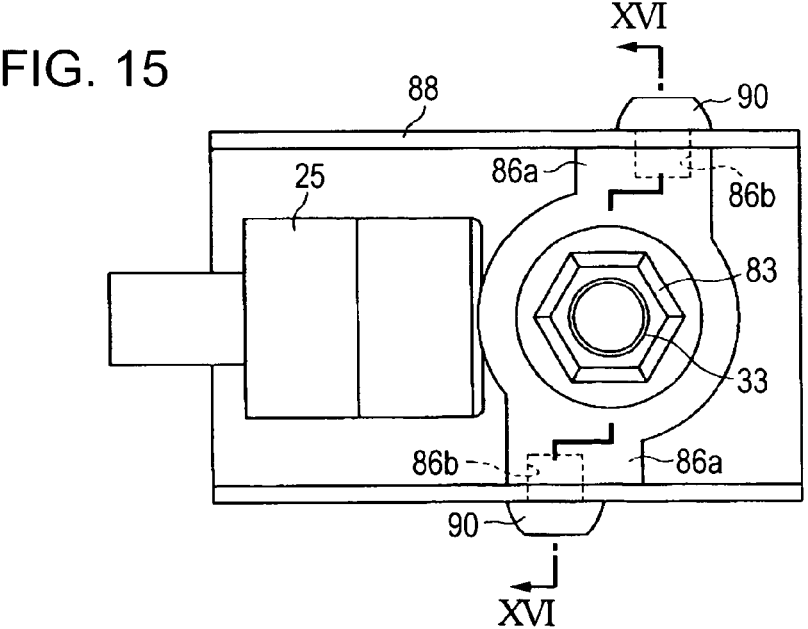
FIG. 15 is a modification of a seat body according to an embodiment of the present invention.
Figure 16:
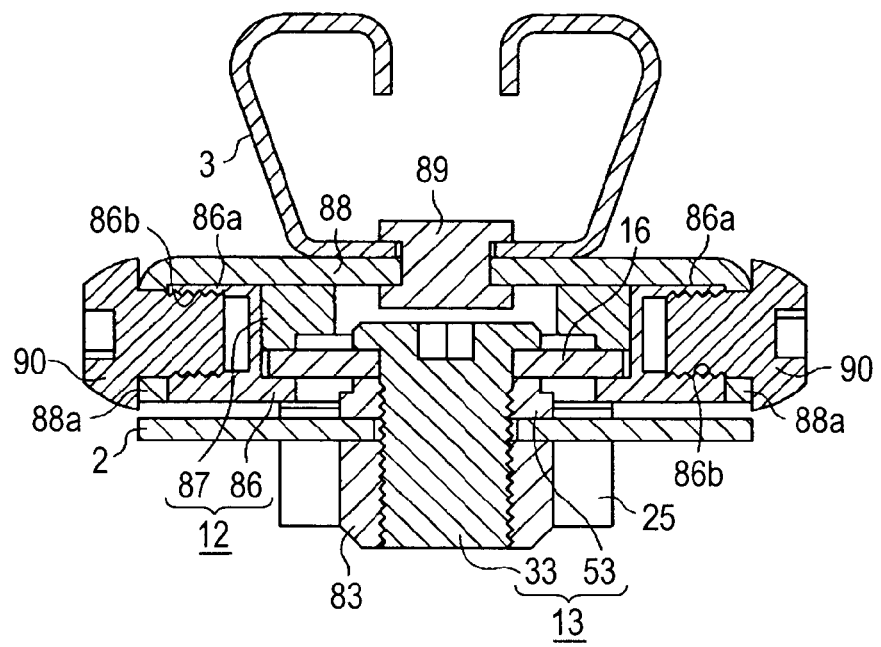
FIG. 16 is a cross-sectional view taken along line XVI-XVI in FIG. 15.

The modification shown in FIG. 14 may be further modified as shown in FIGS. 15 and 16. FIG. 15 is a bottom plan view of a sensor body. FIG. 16 is a cross-sectional view taken along line XVI-XVI in FIG. 15. As shown in FIGS. 15 and 16, a first outer circumferential holder 86 and a second outer circumferential holder 87 constituting the outer circumferential support member 12 is disposed so that the first outer circumferential holder 86 is disposed outside the outer circumference of the second outer circumferential holder 87 and the outer circumferential holders 86 and 87 are stacked in the radial direction. The outer circumferential holders 86 and 87 are welded together by welding directed in the radial direction toward the outer circumference.

In stead of the nut structure 82a, a pair of protruding walls 86a constituting rotation prevention means extends from the first outer circumferential holder 86. As shown in FIG. 15, the protruding walls 86a extend parallel to each other outwards from the first outer circumferential holder 86 so that the protruding walls 86a are not aligned. The protruding walls 86a are disposed symmetrically with respect to a point. Each of the protruding walls 86a has a nut structure 86b having an opening parallel to the radial direction.

A cover member 88 constituting rotation prevention means is joined with the lower rail 3 with a rivet pin 89 so that the two-dimensional light wave conversion optical system 88 is in contact with the bottom surface of the lower rail 3. The cover member 88 has a U-shaped cross-section and includes a pair of walls 88a protruding downward from both sides in the width direction. The protrusion length of the walls 88a is the same as the axial length of the outer circumferential support member 12 (first outer circumferential holder 86). The distance between the inner walls of the walls 88a is the same as the distance between the end surfaces of the protruding walls 86a. The end surfaces of the first outer circumferential holder 86 is covered with the walls 88a of the cover member 88 so that the walls 88a extend in the width direction of the lower rail 3. The outer circumferential support member 12 is joined with the lower rail 3 by screwing bolts 90 into the nut structures 86b with the cover member 88 (walls 88a) interposed between the nut structures 86b and the heads of the bolts 90.

In this way, the rotation prevention means includes the protruding walls 86a extending outward in the radial direction of the outer circumferential support member 12 (first outer circumferential holder 86), the cover member 88 covering the end surfaces of the protruding walls 86a, and the bolts 90 screwed into the nut structures 86b of the protruding walls 86a with the cover member 88 (walls 88a) interposed between the nut structures 86b and the heads of the bolts 90. By using such rotation prevention means, rotation can be prevented even when only one set of a nut structure 86b (protruding walls 86a) and a bolt 90 is provided. In other words, so long as at least one set of a nut structure 86b (protruding walls 86a) and a bolt 90 is provided, the relative rotation of the outer circumferential support member 12 and the lower rail 3 is limited. Since the components can be fixed by mounting the bolt 90 in the width direction, the flexibility of the design is increased.

The holding nut 53 according to the third embodiment may be replaced with a collar not having a screw hole. In such a case, axial force is transmitted via the lower bracket 42 (attachment wall 42a) when the holding nut 56 is screwed into the holding bolt 33. As a result, the edge of the inner circumference of the strain element 16 is held by the collar. This is the same for the modifications shown in FIGS. 14 to 16. In other words, according to these modifications, the fixing nuts 56 and 83 constitute part of the inner circumferential support member.

Figure 17:
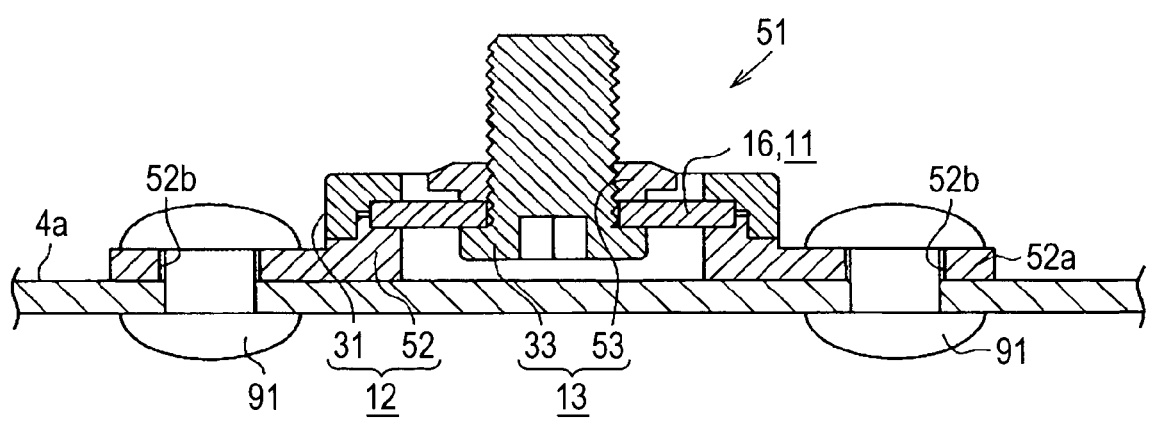
FIG. 17 is a modification of a seat body according to an embodiment of the present invention.

As shown in FIG. 17, the sensor body 51 (outer circumferential support member 12) according to the third embodiment may be joined with the upper rail 4 with rivet pins 91 passed through the bolt holes 52b with the flat surface 4a interposed between the heads of the rivet pins 91.

Figure 18:
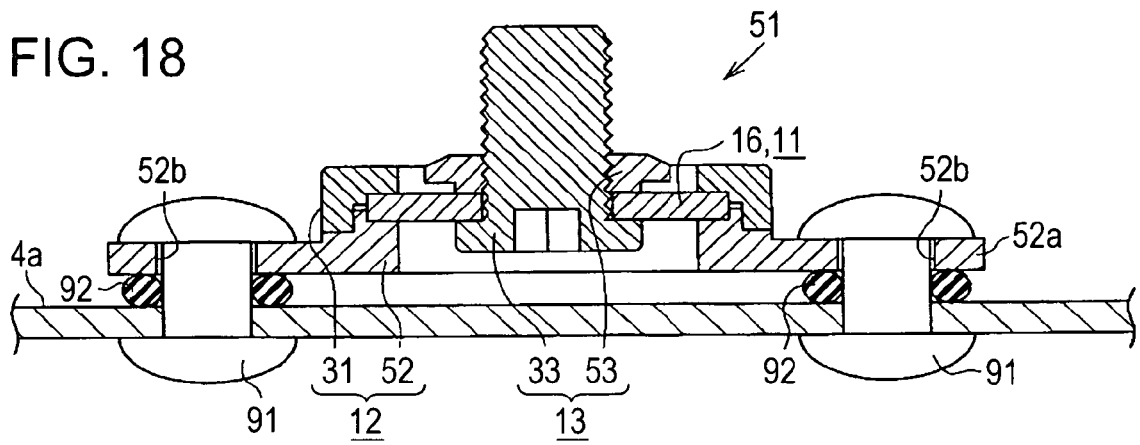
FIG. 18 is a modification of a seat body according to an embodiment of the present invention.
Figure 19:
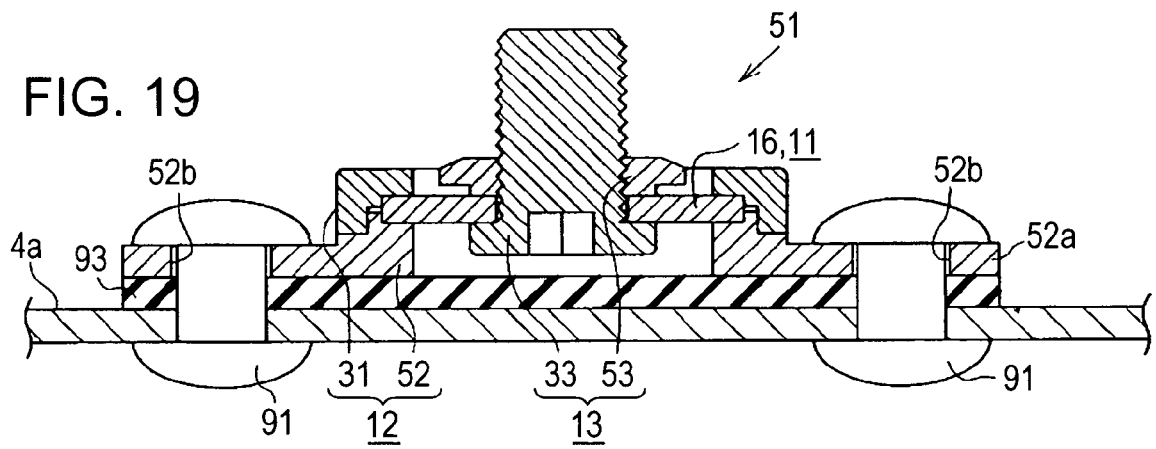
FIG. 19 is a modification of a seat body according to an embodiment of the present invention.

As shown in FIG. 18, O-rings 92, which is an elastic member, may be interposed between flange 52a and the flat surface 4a for the bolt holes 52b. Instead of the O-rings 92, flat washers or spring washers may be used. Furthermore, as shown in FIG. 19, a rubber sheet 93, which is an elastic member, may be interposed between the flat surface 4a and the flange 52a in a manner such that the rubber sheet 93 is covers the entire surface of the flange 52a. In such cases, since the moment of force generated between the flange 52a and the upper rail 4 is absorbed by the elastic member, unwanted distortion of the strain element 16 is suppressed and the load detection accuracy is improved.

Figure 20:
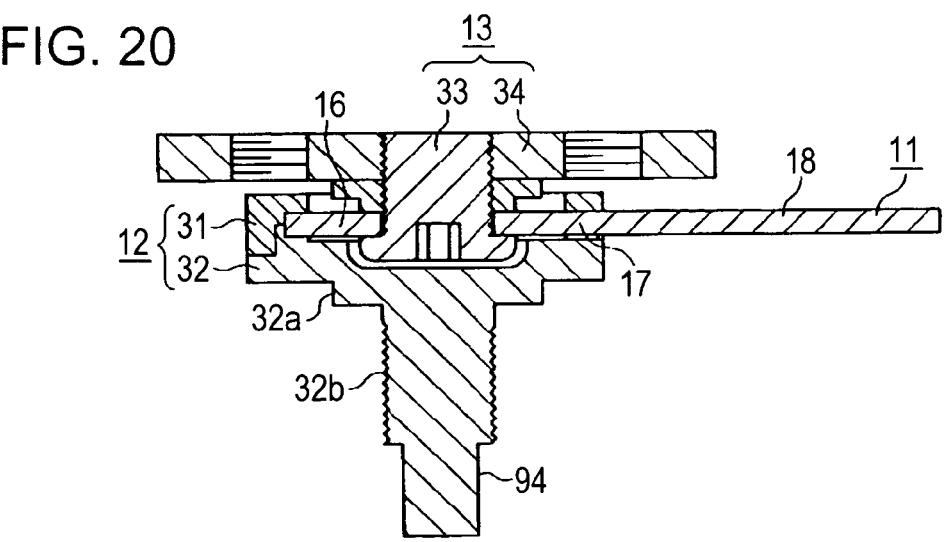
FIG. 20 is a modification of a seat body according to an embodiment of the present invention.

As shown in FIG. 20, the seat load detection apparatus according to the first embodiment may be modified by providing a part 94 having a predetermined width across flat at the tip of the bolt 32b of the second outer circumferential holder 32 so as to prevent the rotation of the bolt 32b. In such a case, by holding the part 94 having a predetermined width across flat, the bolt 32b (outer circumferential support member 12) can be prevented from rotating together with the fixing nut 35 when the bolt 32b is being attached to the leg bracket 2. Accordingly, the outer circumferential support member 12 can be mounted on the leg bracket 2 smoothly.

The seat load detection apparatus according to the first embodiment may be modified by preventing relative rotation of the outer circumferential support member 12 and the leg bracket 2 by engaging the outer circumferential support member 12 and the leg bracket 2. More specifically, the outer circumferential support member 12 (second outer circumferential holder 32) is shaped in the axial direction so that the tip of the reduced-diameter portion 32a has a predetermined width across flat (engagement means). The attachment hole of the leg bracket 2 is formed so that it fits with the reduced-diameter portion 32a having the predetermined width across flat. In this way, the relative rotation of the outer circumferential support member 12 and the leg bracket 2 can be prevented by a simple modification in shape.

The first embodiment may be modified by welding the strain element 16 the second outer circumferential holder 32. In such a case, it is desirable to dispose the strain gauges 21 and 22 printed on the plate member 11 on the first outer circumferential holder 31 side, which is the upper side in FIG. 2.

The fourth embodiment may be modified by vertically disposing the attachment part 62*b* of the holding nut 62 parallel to the axial direction of the fastening part 62*a* but not aligned with the axial line (center line) of the fastening part 62*a*.

Each embodiment may be modified by holding the edge of the outer circumference of the strain element 16 by bolts and nuts in the same manner as holding the inner circumference.

In each embodiment, the external shape of the strain element 16 may be an orthogon so long as the part between the outer circumferential support member 12 and the inner circumferential support member 13 where distortion is actually generated is circular.

In each embodiment, the sensor body interposed between the leg bracket 2 and the lower rail 3 may be interposed between the upper rail 4 and the lower bracket. Similarly, the sensor body interposed between the upper rail 4 and the lower bracket may be interposed between the leg bracket 2 and the lower rail 3.

In each embodiment, the lower bracket and the lower arm may be provided as a unit.

The scope of the present invention and the advantages apparent from the embodiments and modifications are described below.

a) According to a seat load detection apparatus according to first and second aspects of the present invention, the outer circumferential support member has a bolt, and the outer circumferential support member is fixed to one of the seat-fixing member for the floor and the fixing member for the seat by screwing a fixing nut onto a bolt passed through one of the seat-fixing member for the floor and the fixing member for the seat.

b) The seat load detection apparatus according to paragraph a, wherein the bolt has a predetermined width across flat for preventing rotation when screwing the fixing nut. According to the scope of these embodiment, by holding the bolt using the portion having the predetermined width across flat when screwing the fixing nut onto the bolt, the bolt is prevented (outer circumferential support member) from rotating together with the fixing nut. Accordingly, the outer circumferential support member can be smoothly assembled with one of the seat-fixing member for the floor and the fixing member for the seat.

c) According to the seat load detection apparatus according to first and second aspects of the present invention, the inner circumferential support member includes a holding bolt having an axial line extending in the vertical direction and being configured to hold the edge of the inner circumference of the strain element and a holding nut screwed onto the holding bolt, and the holding nut having an attachment hole penetrating in the width direction of the holding nut, the attachment hole being provided so as to attach the other one of the seat-fixing member for the floor and the fixing member for the seat. According to the scope of these embodiment, even if there is not enough space to join the inner circumferential support member and the other one of the seat-fixing member for the floor and the fixing member for the seat by vertically engaging fastening devices, such as bolts and nuts, as in the third embodiment, the attachment hole of the holding nut can be used to assemble such fastening devices in the width direction (penetration direction). Accordingly, flexibility of the design is increased without increasing the number of components.

d) The seat load detection apparatus according to paragraph c, wherein the other one of the seat-fixing member for the floor and the fixing member for the seat is pivotably joined with to the attachment hole. According to the scope of these embodiments, the other one of the seat-fixing member for the floor and the fixing member for the seat is allowed to slightly rotate around the axial line of the attachment hole or, in other words, allowed to pivot in the forward and backward direction. Accordingly, the assembly error in the forward and backward direction generated between the other one of the seat-fixing member for the floor and the fixing member for the seat and the holding nut (inner circumferential support member) can be absorbed within the range of allowance. In this way, smooth assembly is possible. Since, during assembly, load applied in a direction causing the other one of the seat-fixing member for the floor and the fixing member for the seat to tilt in the forward and backward directions is released, unwanted distortion caused by the moment of force generated between the lower bracket 65 and the holding nut (inner circumferential support member) is reduced. As a result, the detection accuracy is improved.

e) The seat load detection apparatus according to the first to tenth aspects and paragraphs a to d, wherein the outer circumferential support member has a notch for guiding the substrate outside the apparatus.

f) The seat load detection apparatus according to the first to tenth aspects and paragraphs a to e, wherein at least one of the outer circumferential support member and the inner circumferential support member has a draining hole penetrating through the support member in the vertical direction. According to the scope of these embodiments, water that has entered a storage space defined by the outer circumferential support member and the inner circumferential support member can be drained from the draining hole.

What is claimed is:

1. A seat load detection apparatus configured to detect a load applied on a seat, the apparatus being interposed between a seat-fixing member for a floor and a fixing member for the seat, the apparatus comprising:

a plate member forming a unit including a circular strain element having an axis extending in the vertical direction and a substrate extending the radial direction of the strain element;

an outer circumferential support member configured to support the edge of the outer circumference of the strain element, the outer circumferential support member being attached to one of the seat-fixing member for the floor and the fixing member for the seat;

an inner circumferential support member configured to support the edge of the inner circumference of the strain element the inner circumferential support member being attached on the other one of the seat-fixing member for the floor and the fixing member for the seat;

a detection element configured to output a signal corresponding to the load applied to the strain element in the axial direction on the basis of distortion generated between the outer circumference and the inner circumference of the strain element, the detection element being disposed on the strain element;

an electric circuit configured to process the signal output from the detection element, the electric circuit being electrically connected to the detection element and being mounted on the substrate;

wherein, the outer circumferential support member includes a first holding member and a second holding member, the first holding member and the second holding member are stacked along the axial direction of the strain element at the outward area in the radial direction of the strain element and sandwich the edge of the outer circumference of the strain element; and wherein, the first holding member and the second holding member stacked along the axial direction of the strain element are welded together by welding directed at the outward area in the radial direction.

2. The seat load detection apparatus according to claim 1, wherein,
the inner circumferential support member has a nut, and
the inner circumferential support member is fixed to the other one of the seat-fixing member for the floor and the fixing member for the seat by screwing the nut onto a bolt with the other one of the seat-fixing member for the floor and the fixing member for the seat being interposed between the nut and the head of the bolt.

3. The seat load detection apparatus according to claim 1, further comprising:
rotation prevention means for limiting the relative rotation of the outer circumferential support member and one of the seat-fixing member for the floor and the fixing member for the seat.

4. The seat load detection apparatus according to claim 1, further comprising:
rotation prevention means for limiting the relative rotation of the inner circumferential support member and the other one of the seat-fixing member for the floor and the fixing member for the seat.

5. A seat load detection apparatus configured to detect a load applied on a seat, the apparatus being interposed between a seat-fixing member for a floor and a fixing member for the seat, the apparatus comprising:
a plate member forming a unit including a circular strain element having an axis extending in the vertical direction and a substrate extending in the radial direction of the strain element;
an outer circumferential support member configured to support the edge of the outer circumference of the strain element, the outer circumferential support member being attached to one of the seat-fixing member for the floor and the fixing member for the seat;
an inner circumferential support member configured to support the edge of the inner circumference of the strain element, the inner circumferential support member being attached on the other one of the seat-fixing member for the floor and the fixing member for the seat;
a detection element configured to output a signal corresponding to the load applied to the strain element in the axial direction on the basis of distortion generated between the outer circumference and the inner circumference of the strain element, the detection element being disposed on the strain element;
an electric circuit configured to process the signal output from the detection element, the electric circuit being electrically connected to the detection element and being mounted on the substrate;
wherein, the outer circumferential support member includes a first holding member and a second holding member, the first holding member and the second holding member are stacked along the axial direction of the strain element at the outward area in the radial direction of the strain element and sandwich the edge of the outer circumference of the strain element; and wherein the outer circumferential support member has a notch for guiding the substrate outside the apparatus.

6. The seat load detection apparatus according to claim 5, wherein,
the inner circumferential support member has a nut, and
the inner circumferential support member is fixed to the other one of the seat-fixing member for the floor and the fixing member for the seat by screwing the nut onto a bolt with the other one of the seat-fixing member for the floor and the fixing member for the seat being interposed between the nut and the head of the bolt.

7. The seat load detection apparatus according to claim 5, further comprising:
rotation prevention means for limiting the relative rotation of the outer circumferential support member and one of the seat-fixing member for the floor and the fixing member for the seat.

8. The seat load detection apparatus according to claim 7, wherein,
the rotation prevention means includes a plurality of fixing units configured to join the outer circumferential support member and one of the seat-fixing member for the floor and the fixing member for the seat.

9. The seat load detection apparatus according to claim 8, wherein,
the outer circumferential support member comprises a flange extending outwards in the radial direction, and
each of the fixing units includes a fastening member configured to join the flange and one of the seat-fixing member for the floor and the fixing member for the seat.

10. The seat load detection apparatus according to claim 9, further comprising:
an elastic material interposed between the flange and one of the seat-fixing member for the floor and the fixing member for the seat.

11. The seat load detection apparatus according to claim 5, further comprising:
rotation prevention means for limiting the relative rotation of the inner circumferential support member and the other one of the seat-fixing member for the floor and the fixing member for the seat.

12. A seat load detection apparatus configured to detect a load applied on a seat, the apparatus being interposed between a seat-fixing member for a floor and a fixing member for the seat, the apparatus comprising:
a plate member forming a unit including a circular strain element having an axis extending in the vertical direction and a substrate extending in the radial direction of the strain element;
an outer circumferential support member configured to support the edge of the outer circumference of the strain element, the outer circumferential support member being attached to one of the seat-fixing member for the floor and the fixing member for the seat;
an inner circumferential support member configured to support the edge of the inner circumference of the strain element, the inner circumferential support member being attached on the other one of the seat-fixing member for the floor and the fixing member for the seat;
a detection element configured to output a signal corresponding to the load applied to the strain element in the axial direction on the basis of distortion generated between the outer circumference and the inner circumference of the strain element, the detection element being disposed on the strain element; and
an electric circuit configured to process the signal output from the detection element, the electric circuit being electrically connected to the detection element and being mounted on the substrate;

wherein at least one of the outer circumferential support member and the inner circumferential support member has a draining hole penetrating through the support member in the vertical direction.

* * * * *